July 9, 1935.                G. F. SHEARMAN                2,007,312
                           MEANS FOR MAKING NAILS
                      Filed March 23, 1935        2 Sheets-Sheet 1
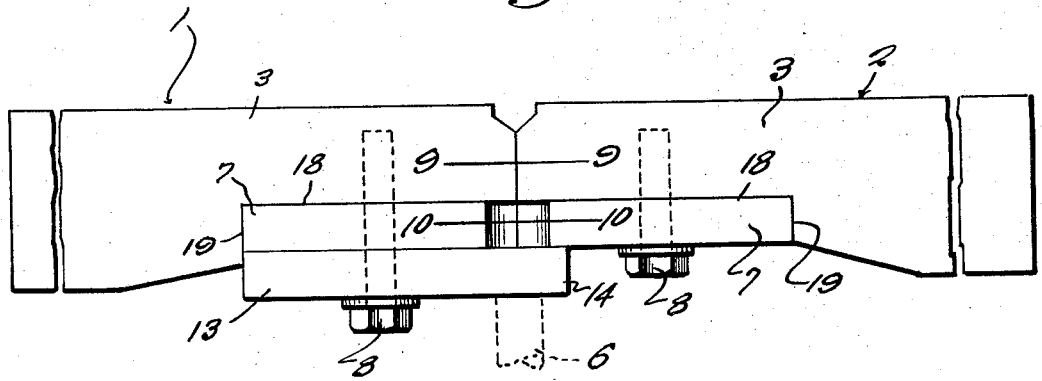
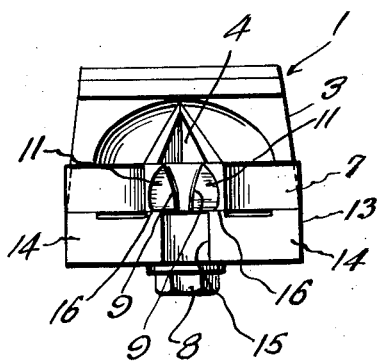
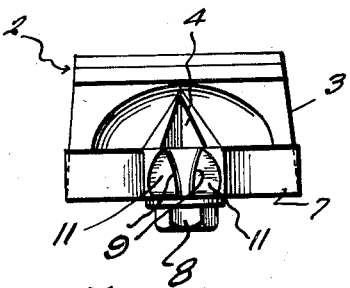
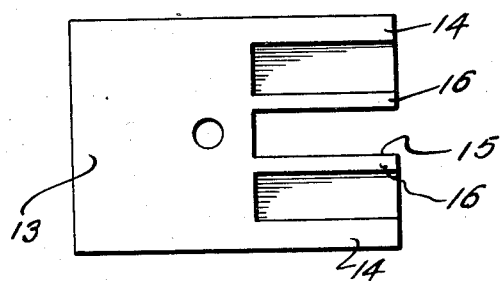
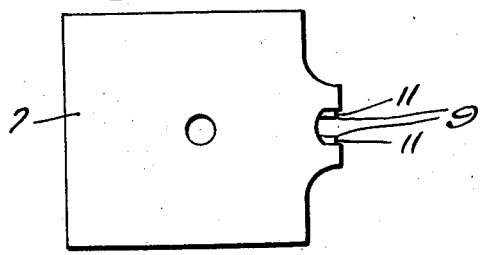
Inventor
George F. Shearman
By Clarence A. O'Brien
                    Attorney July 9, 1935. G. F. SHEARMAN 2,007,312
MEANS FOR MAKING NAILS
Filed March 23, 1935 2 Sheets-Sheet 2
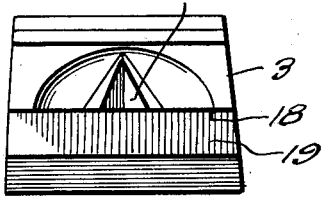
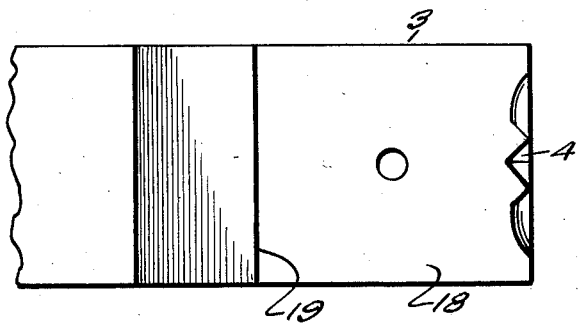
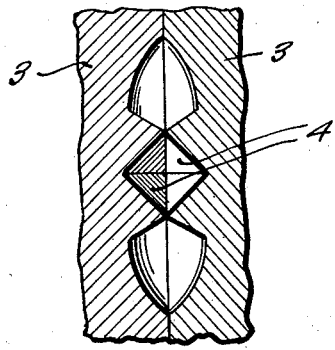
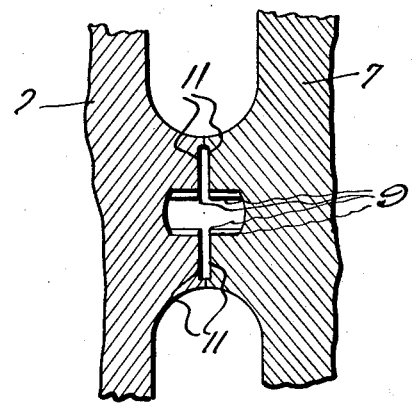
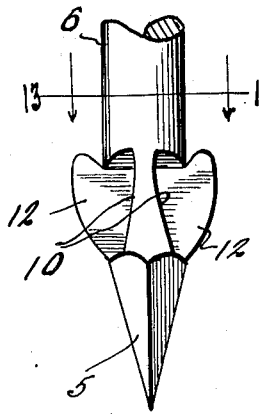
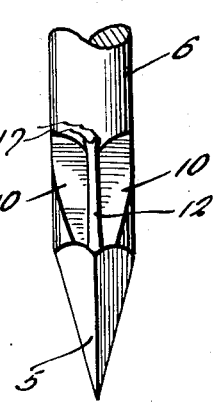
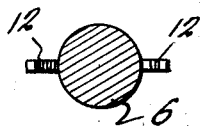
Inventor
George F. Shearman
By Clarence A. O'Brien
Attorney Patented July 9, 1935

2,007,312

UNITED STATES PATENT OFFICE 2,007,312

MEANS FOR MAKING NAILS

George F. Shearman, Chicago, Ill., assignor of fifty per cent to William E. Boyington, Chicago, Ill.

Application March 23, 1935, Serial No. 12,688

4 Claims. (Cl. 10—53)

The present invention relates to new and useful improvements in means for manufacturing nails and similar fastening devices, and has for its primary object to provide dies embodying a novel construction through the medium of which anchoring indentations may be formed in the nail preferably adjacent the point thereof, the material removed from the nail in making the indentations constituting anchoring barbs.

Other objects of the invention are to provide means of the aforementioned character which will be comparatively simple in construction, strong, durable, highly efficient and reliable in operation, compact, and which may be manufactured at low cost.

The foregoing and many other objects and advantages of the invention will become apparent from a study of the following specification, taken in connection with the accompanying drawings wherein like characters of reference designate corresponding parts throughout the several views, and wherein:—

Figure 1 is a view in side elevation of a pair of coacting dies constructed in accordance with the present invention.

Figure 2 is a view in end elevation of one of the units.

Figure 3 is an end elevational view of the other unit.

Figure 4 is a detail view in top plan of the barb shaping member.

Figure 5 is a detail view in plan of one of the barb forming members.

Figure 6 is a detail view looking at the inner end of either of the point forming members.

Figure 7 is a detail view, looking at the inner end of either of the barb forming members.

Figure 8 is a bottom plan view of a portion of either of the point forming members.

Figure 9 is a fragmentary view in horizontal section, taken substantially on the line 9—9 of Figure 1.

Figure 10 is a fragmentary view in horizontal section, taken substantially on the line 10—10 of Figure 1.

Figure 11 is a view in front elevation of a portion of a nail formed in the dies constituting the present invention.

Figure 12 is a view in side elevation of the nail.

Figure 13 is a horizontal sectional view, taken substantially on the line 13—13 of Figure 11.

Referring now to the drawings in detail, it will be seen that the embodiment of the invention which has been illustrated comprises a pair of coacting units which are designated generally by the reference numerals 1 and 2. The units 1 and 2 comprise substantially duplicate point dies 3 the coacting ends of which are formed, as at 4 (see Figures 6 and 9) to shape the point 5 on one end of a nail 6

The units 1 and 2 further include indentation and barb forming die members 7 which are secured in position by bolts 8 beneath the members 3. The opposed ends of the members 7 include cutting or punching edges 9 (see Figure 7) which form the anchoring indentations 10 in the shank of the nail 6 immediately adjacent the point 5. The members 7 further include coacting faces 11 adjacent the cutting or punching edges 9 for forming the anchoring barbs 12 from the material which is displaced in forming the indentations 10.

The unit 1 still further includes a barb-shaping member 13 which is secured beneath the respective member 7 by the respective bolt 8. The member 13 includes bifurcations 14 which project beneath the member 7 of the unit 2 when the units 1 and 2 are brought together as clearly shown in Figure 1 of the drawings. Referring now to Figure 4 of the drawings, it will be seen that the bifurcations 14 define a longitudinal slot 15 which accommodates the shank of the nail being made. The inner marginal portions of the tops of the bifurcations 14 are formed to provide faces 16 which are engageable by the anchoring barbs 12 in a manner to restrict said anchoring barbs at their upper ends during the manufacture of the nail. Of course, it will be understood that with the dies arranged as in Figure 1, the nail is inverted during the aforementioned operations. In addition to shaping the anchoring barbs 12, the member 13 swages the substantially pointed upper ends of said anchoring barbs in a manner to provide anchoring spurs 17 thereon, as shown to advantage in Figure 12.

It is thought that the operation of the invention will be readily apparent from a consideration of the foregoing. When the units 1 and 2 are brought together, the members 3 form the point 5 on the nail 6, the members 7 form the indentations 10 and the barbs 12, and the member 13 shapes the upper ends of the barbs 12. The members 3 are recessed on their lower sides, as at 18, to accommodate the members 7 and 13, the recesses 18 providing shoulders 19 which said members 7 and 13 abut at their outer ends. It will thus be seen that means has been provided for forming the points, anchoring indentations, and anchoring barbs simultaneously on the nail.

It is believed that the many advantages of a nail making means constructed in accordance with the present invention will be readily understood, and although a preferred embodiment of the invention is as illustrated and described, it is to be understood that modifications or changes in the details of construction and in the combination and arrangement of parts may be resorted to which will fall within the scope of the invention as claimed. For example, the members 3 and 7 of the units 1 and 2 may be integral and the member 13 left as a separate part or, if desired, the members 3, 7 and 13 of the unit 1 may be integral.

What is claimed is:—

1. A nail die comprising a pair of units, each unit including coacting members comprising means for forming a point on a nail, each unit further including coacting means for cutting indentations in the nail, each unit still further including coacting means for forming anchoring barbs on the nail from the material cut from said nail.

2. A nail die comprising a pair of units, each unit including coacting members for forming a point on a nail, and coacting members mounted on the first-named members and comprising means for cutting indentations in the nail adjacent the point, the second-named members further including coacting means for forming barbs on the nail from the material cut from said nail.

3. A nail die comprising a pair of units, each unit including coacting members for forming a point on a nail, coacting members mounted on the first-named members and comprising means for cutting indentations in the nail adjacent the point, the second-named members further including means for forming barbs on the nail from the material cut from said nail, and a member mounted on one of the second-named members for shaping the barbs.

4. A nail die comprising a pair of units, said units including coacting means for forming a point on a nail, said units further including coacting means for cutting indentations in the nail adjacent the point, said units further including coacting means for forming barbs on the nail from the material cut from said nail, and means on one of said units for shaping the barbs.

GEORGE F. SHEARMAN.